June 4, 1968  C. F. BACHLE  3,386,347
RETAINER STRUCTURE FOR VARIABLE COMPRESSION RATIO PISTON
Filed Dec. 13, 1965  2 Sheets-Sheet 1

INVENTOR.
CARL F. BACHLE
BY
ATTORNEYS

June 4, 1968        C. F. BACHLE        3,386,347
RETAINER STRUCTURE FOR VARIABLE COMPRESSION RATIO PISTON
Filed Dec. 13, 1965        2 Sheets-Sheet 2
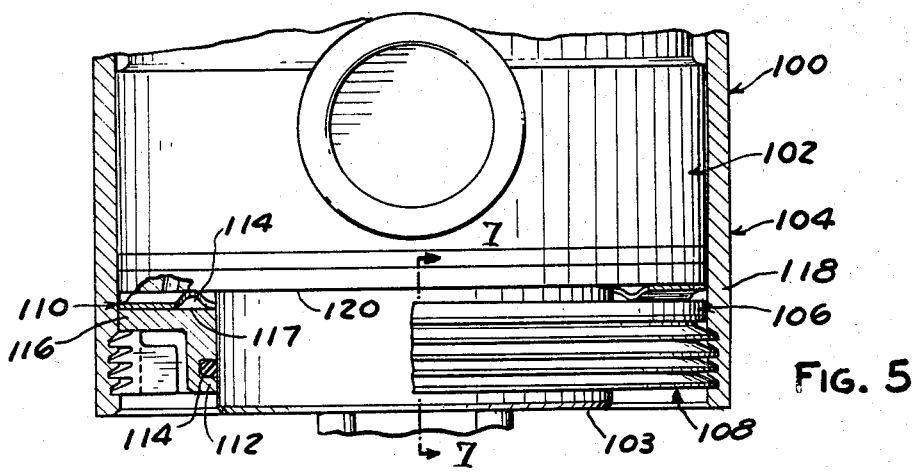
FIG. 5
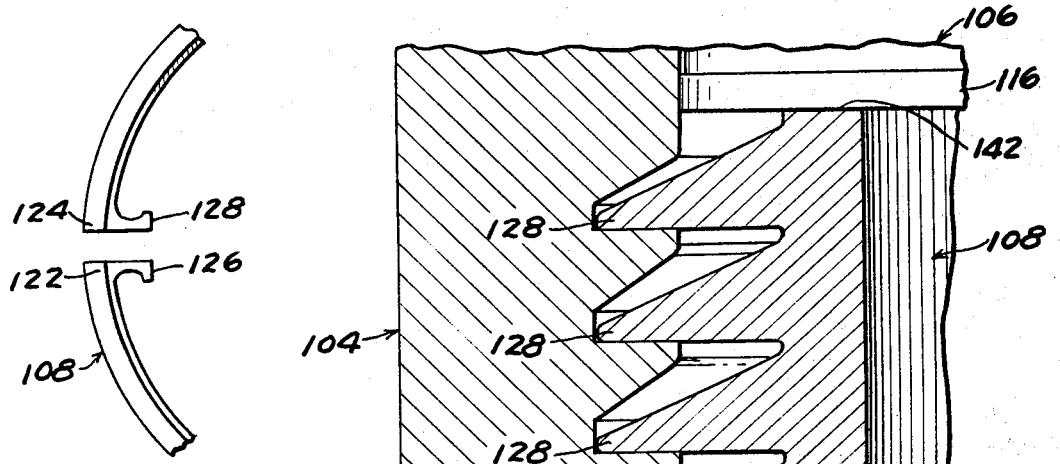
FIG. 6
FIG. 7
INVENTOR.
CARL F. BACHLE
BY
ATTORNEYS United States Patent Office 3,386,347
Patented June 4, 1968

3,386,347
RETAINER STRUCTURE FOR VARIABLE COMPRESSION RATIO PISTON
Carl F. Bachle, Grosse Pointe Farms, Mich., assignor to Continental Aviation and Engineering Corporation, Detroit, Mich., a corporation of Virginia
Filed Dec. 13, 1965, Ser. No. 513,250
10 Claims. (Cl. 92—216)

ABSTRACT OF THE DISCLOSURE

A variable compression ratio piston for an internal combustion engine wherein movement of the outer shell toward the combustion chamber is restrained by a retainer ring held axially in place on the shell by a resilient self-expanding snap ring having a series of circular lands engaging complementary lands on the shell.

---

This invention relates to improvements in variable compression ratio (VCR) pistons such as those disclosed in U.S. Patent No. 2,742,027, and more particularly to improved retention structure for maintaining in assembled relation the outer shell and inner carrier parts of a reciprocating piston of the VCR type.

An object of the present invention is to provide an improved VCR piston having a simplified retention structure which facilitates assembly and maintenance of the inner carrier and outer shell of the VCR piston.

Other objects, features and advantages of the present invention will become apparent in the following description taken in conjunction with the accompanying drawings wherein:

FIG. 5 is a fragmentary vertical section along the axis of an improved VCR piston constructed in accordance with another embodiment of the present invention.

FIG. 6 is a fragmentary top plan view of a modified snap ring employed in the embodiment of FIG. 5.

FIG. 7 is a greatly enlarged fragmentary sectional view taken on the line 7—7 of FIG. 5.

Figure 1:
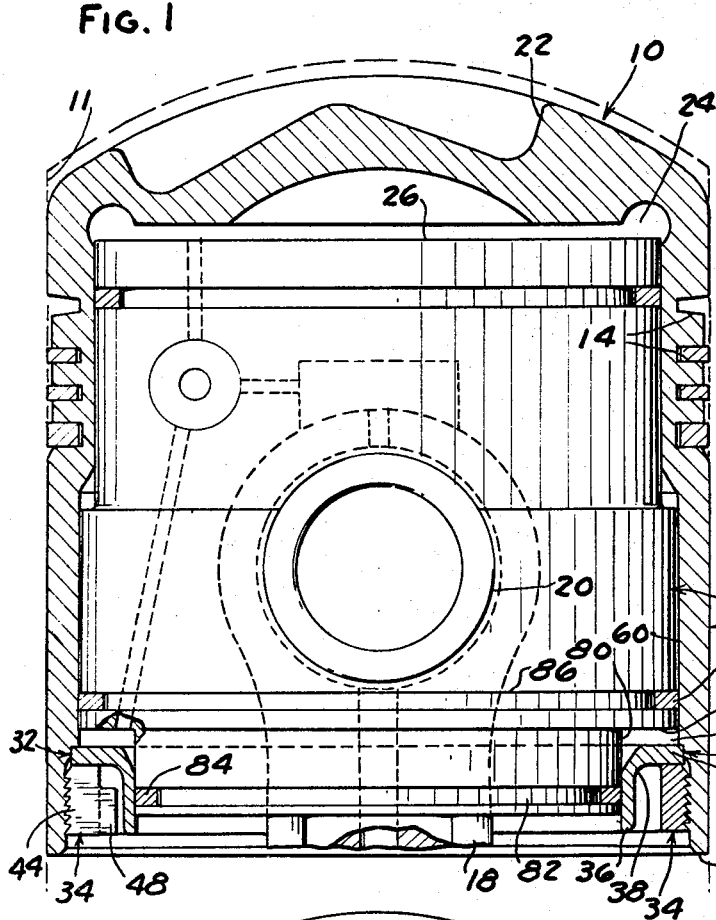
FIG. 1 is a vertical section along the axis of an improved VCR piston constructed in accordance with the present invention.

Referring to FIG. 1, there is shown by way of example a VCR piston indicated generally by the reference numeral 10 adapted for reciprocation in the bore of a cylinder, indicated 11 and shown in phantom, of a four-stroke cycle internal combustion engine. The automatic, hydraulically actuated VCR piston illustrated in FIG. 1 includes two main parts: the piston shell 12 (outer member) externally grooved to carry piston rings 14, and the carrier 16 (inner member). Carrier 16 is linked to the crankshaft of the engine by a connecting rod 18 and wrist pin 20 and always moves with the upper end of rod 18 between fixed upper and lower limits, whereas shell 12 is free to move within certain limits relative to carrier 16 and hence rod 18. The relative movement provides a variable height from the center of the pin 20 to the top crown 22 of piston 10, thus effecting a variation in the compression ratio through a change in the clearance volume in cylinder 11 of the engine without any change in engine displacement.

The movement of shell 12 is restrained hydraulically by oil contained within an upper chamber 24 formed between crown 22 and the top surface 26 of carrier 16, and by the oil contained within an annular lower chamber 28 formed between an annular undersurface 30 of carrier 16 and a retainer ring 32 which comprises one part of a two part retention structure of the present invention. The position of shell 12 and carrier 16 relative to each other is determined by the control of the quantity of oil in, and thus the volumes of, the upper and lower chambers 24 and 28. Further details relative to the automatic hydraulic control of the VCR piston 10 and its operation are set forth in U.S. Patent No. 2,742,027.

The present invention is concerned with improvements in the retention structure which forms the stop for limiting upward movement of shell 12 relative to carrier 16 of the VCR piston 10. The retention structure of the present invention comprises the aforementioned retainer ring 32 and a parted snap ring 34 adapted to hold the retainer ring in place on shell 12.

Figure 2:
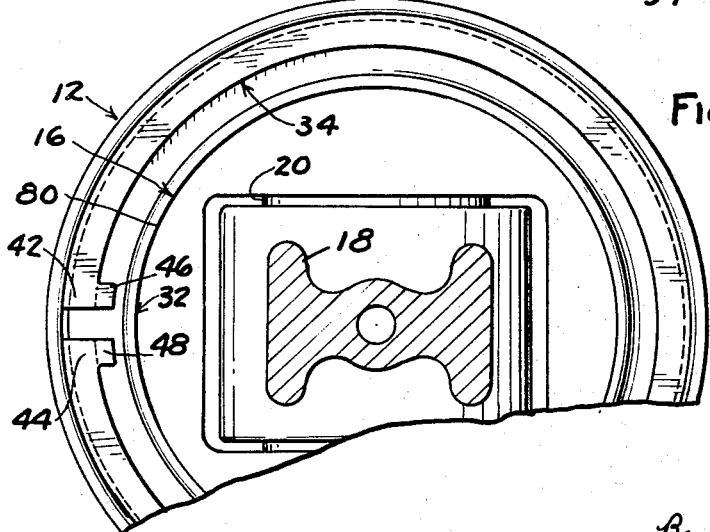
FIG. 2 is a fragmentary bottom view of the piston of FIG. 1.

As best seen in FIGS. 1 and 2, retainer ring 32 is a continuous annular member. In radial cross section ring 32 is generally L-shaped and comprises a vertical or axially extending annular wall 36, an outwardly conically flaring wall 38 and an annular flange 40 extending radially outwardly from wall 38.

Snap ring 34 comprises an annular member (FIG. 2) which is parted at the ends 42 and 44 thereof and dimensioned relative to the inside diameter of shell 12 such that ends 42 and 44 are spaced apart subsequent to assembly of ring 34 in shell 12. Ring 34 is generally rectangular in radial cross section and has a pair of lugs 46 and 48 integral with ends 42 and 44 respectively. Lugs 46 and 48 extend radially inwardly from the inner periphery of ring 34 to a point spaced from the outer periphery of wall 36 of retainer ring 32. The outer periphery of ring 34 has a series of axially spaced circumferential lands 50 (FIGS. 3 and 4) which run from one end 42 to the other end 44. Each land 50 has a cross-sectional configuration similar to a buttress thread, but it is to be understood that lands 50 are circular and not helical and hence do not comprise a screw thread. Rather lands 50 provide a series of individual circular serrations on the periphery of ring 34. Preferably each land 50 has an upper conical surface 52 inclined downwardly at an angle of about 30° from the axis of ring 34, a lower conical land surface 54 inclined upwardly about 85° from the axis of ring 34 and a small outer cylindrical surface 56 disposed parallel to the axis of ring 34.

Figure 3:
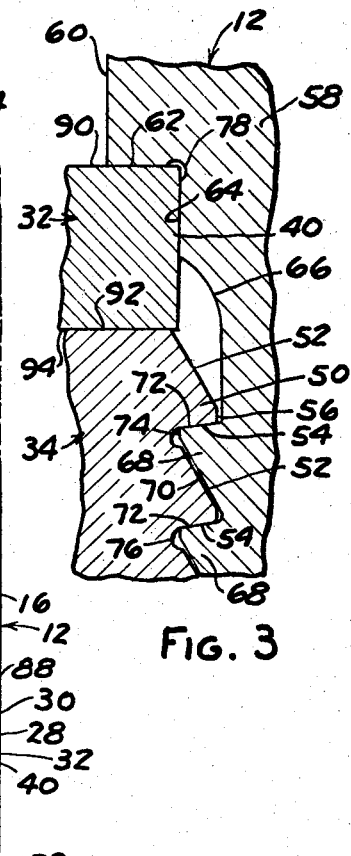
FIG. 3 is a greatly enlarged fragmentary sectional view of a portion of the retention structure shown in FIG. 1.
Figure 4:
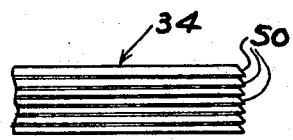
FIG. 4 is a fragmentary elevational view of one preferred form of snap ring forming one element of the retention structure of this invention.

The lower end of the skirt 58 of shell 12 is machined in a manner to cooperate with rings 32 and 34 as best shown in FIGS. 1 and 3. The interior surface of skirt 58 is counterbored to form a radial surface 62 coincident with surface 30 at the upper limit of travel of shell 12 relative to carrier 16. Surface 62 terminates at its outer edge at a cylindrical surface 64 having a diameter larger than the outside diameter of flange 40 of ring 32 so that ring 32 may be received with a sliding fit within the counterbore defined by surface 64. About halfway down along the outer periphery of flange 40, skirt 58 is cut away at 66 to an inside diameter slightly larger than the outside diameter of lands 50 when fully interengaged with complementary internal lands 68 formed in the inner periphery of skirt 58 below the surface 66. Internal lands 68 are reversed from external lands 50 and have surfaces 70, 72 and 74 corresponding respectively to the surfaces 52, 54 and 56 of lands 50. Suitable stress relief radii 76 and 78 are provided respectively between lands 50 in ring 34 and at the junction of surfaces 62 and 64 in skirt 58.

Carrier 16 has a reduced diameter cylindrical extension portion 80 (FIG. 1) the outer cylindrical surface of which forms the inner wall of lower chamber 28 of piston 10. Extension 80 is dimensioned to have a close sliding fit within wall 36 of ring 32 and is grooved at 82 to carry a sealing ring 84 to seal the clearance space between extension 80 and ring 32. Carrier 16 is likewise grooved at 86 above its radial surface 30 to carry a sealing ring 88 for sealing the clearance space between carrier 16 and the inner wall 60 of skirt 58.

The above described retainer ring 32, snap ring 34 and cooperating piston structure define the lower annular fluid chamber 28 in the assembled relation of these parts and provide the upper limit stop structure of piston 10. To assemble these various parts, carrier 16 is first installed in shell 12 prior to assembly of rings 32 and 34 in the latter by slipping carrier 16 endwise into the open bottom end of shell 12 until the carrier is in the position shown in FIG. 1. Then retainer ring 32 is slipped endwise onto extension 80 and axially or upwardly into shell 12 until its upper surface 90 abuts surface 62 of skirt 58 (FIGS. 1 and 3). Snap ring 34 is then radially compressed by pinching lugs 46 and 48 together with a pliers or other suitable tool and, while thus radially contracted to an outside diameter sufficient to cause lands 50 to clear lands 68, ring 34 is inserted into the open end of shell 12 beneath retainer ring 32 until the upper surface 92 of ring 34 (FIG. 3) abuts the undersurface 94 of flange 40 of ring 32. The rings 32 and 34 are pressed firmly upwardly as far as they will go, at which point lands 50 of ring 34 are designed to register with the corresponding grooves formed between the internal lands 68 on skirt 58. Lugs 46, 48 are then released, allowing the resiliency of snap ring 34 to expand itself radially to bring lands 50 into mating engagement with lands 68 of skirt 58.

It is to be understood that snap ring 34, is made from resilient material, preferably steel, and with a proper outside diameter in its fully expanded or free state such that radial contraction of the ring to its outside diameter when compressed by engagement with skirt 58 produces a self-expansion force sufficient to insure tight engagement between snap ring 34 and the skirt of shell 12. Due to the inclination of the mating surfaces 72 and 54 of lands 68 and 50 respectively, ring 34 is cammed upwardly or axially toward flange 40 of ring 32 as it expands into full seating engagement with lands 68 of the shell 12. When so engaged the mutually adjacent surfaces 52 and 70 of lands 50 and 68 are spaced from one another to allow for further radial expansion of snap ring 34 as wear occurs. Preferably the inclination of surfaces 54 and 72 is suitably correlated with the expansion force of snap ring 34 and with the coefficient of friction of the materials employed in lands 50 and 68 to produce a self-locking action whereby axial downward force exerted on snap ring 34 cannot cause inward radial slip or contraction once the snap ring and shell are interengaged as shown in FIG. 3.

To disassemble carrier 16 from shell 12, lugs 46 and 48 are merely pinched together with the aforementioned assembly tool to thereby radially contract snap ring 34 until its lands 50 disengage and clear lands 68, whereupon ring 34 is easily withdrawn from the lower end of the shell. Then retainer ring 32 may be slipped downwardly out of shell 12, after which carrier 16 is likewise removed from shell 12.

From the foregoing description, it will now be apparent that the improved inner piston retainer structure of the present invention provides an easily assembled and disassembled fluid sealing stop structure for limiting relative movement of the shell and carrier in one direction. Manufacture is simplified since retainer ring 32 is not a threaded member but rather has only circular land surfaces which may be readily machined to close tolerances. The need for a close tolerance fit between the outer periphery of flange 40 and inner surface 64 is eliminated because the primary fluid seal is obtained between the upper side 90 of flange 40 and the undersurface 62 of skirt 58. The camming action which occurs when ring 34 expands outwardly into engagement with lands 68 of skirt 58 reduces the need for close tolerances in the formation of the respective internal and external lands 50 and 68 on these members and also provides self-adjustment takeup as wear occurs. In addition to the aforementioned self-locking action, the buttress-type formation of the lands permits a reduction in the depth of the lands without sacrificing strength requirements, thereby permitting a concomitant reduction in the wall thickness of skirt 58 adjacent ring 34 as well as the use of a radially thinner cross section in ring 34. This feature plus the two piece construction contribute to material savings and, more importantly, to weight reduction in the VCR piston.

Referring to FIGS. 5, 6 and 7, a modified retention structure also in accordance with the present invention is shown in a modified VCR piston 100 which, like piston 10, consists of an inner part or carrier 102 on which is movably mounted a piston shell 104, these parts being relatively movable and operable in the manner of the corresponding parts of piston 10. The modified retention structure of piston 100 comprises three principal parts, namely a retainer ring 106, a parted snap ring 108 and an annular axially corrugated washer 110.

Retainer ring 106 resembles ring 32 in that it is generally L-shaped in radial cross section and is adapted to slidably receive the lower reduced diameter extension 103 of carrier 102. The cylindrical portion 112 of ring 106 has an internal groove which carries an O-ring 114 for sealing the engagement between ring 106 and extension 80. The outer periphery of the radial flange portion 116 of ring 106 is adapted to have a fluid tight sealing engagement with the inner wall of the skirt 118 of shell 104.

Washer 110 is an annular axially corrugated resilient spring metal member which is disposed between the underside 120 of the carrier 102 and the radial upper surface 117 of flange 116. Washer 110 is designed such that it is always under compression between these two members and is adapted to accommodate the axial movement of carrier 102 relative to shell 104 between the end limits of such movement. However, the separational force exerted by washer 110 is very small compared to the hydraulic pressures encountered during the normal cycle of operation of piston 100 and consequently is an insignificant factor in the hydraulic regulation of the axial movement of carrier 102 and shell 104 relative to one another.

Snap ring 108 is generally similar to snap ring 34 in that it is an annular member parted at its ends 122 and 124 (FIG. 6), ring 108 being dimensioned relative to the inside diameter of shell 104 such that ends 122 and 124 are spaced apart subsequent to the snap ring being compressed for assembly into the shell. Ring 108 has a pair of lugs 126 and 128 which are used in the same manner as lugs 46 and 48. Likewise, the outer periphery of ring 108 has a series of axially spaced external circumferential lands 128 which run from one end 122 to the other end 124, the undersurfaces 130 and upper surfaces 132 of lands 128 being respectively parallel. However, the cross-sectional configuration of each land 128 has a much larger radial dimension relative to its axial dimension than the buttress type lands 50 of rings 34. By way of example, the undersurface 130 of each land 128 may lie in a radial plane whereas the upper surface 132 may be inclined approximately 60° from the axis of ring 108 versus the 30° inclination of surfaces 52 of lands 50.

The lower end of skirt 118 of shell 104 is machined about the interior surfaces thereof to form internal lands 134 reversed from the external lands 128 of the ring 108. Each internal land 134 has a lower surface 136 inclined at approximatley at 45° angle to the axis of shell 104, and lands 134 are axially spaced from one another by axially extending back wall 138, thereby providing a relatively large clearance between mutually adjacent surfaces 132 and 136. The upper surface 140 of each land 134 is disposed in a radial plane and is adapted to have an abutting contact engagement with the radial undersurface 130 of the associated external lands 128 of ring 108.

Due to the reduced axial thickness and increased radial dimensions of the ring lands 128, these lands act as cantilever beams which can flex under the load imposed by the upward thrust of shell 104 relative to carrier 102 to insure that this thrust load is distributed to all lands 128 and their associated supporting lands 134 of shell 104. This feature plus the large clearance engagement of lands 128 in the grooves formed between each of the internal lands 136 on the shell increase the permissible tolerances in machining ring lands 128 and shell lands 134, thereby reducing the manufacturing costs and facilitating assembly of the retention structure. Since the flexibility of lands 128 insures that the force transmitted from ring 108 into the outer shell 104 of the piston is equally shared between the lands 134, the maximum stress limit for each land 134 is correspondingly reduced which in turn permits a reduction in the radial thickness of skirt 118.

Washer 110 provides a constant biasing force urging flange 116 of ring 106 into engagement with the upper surface 142 of ring 108, thereby maintaining an effective seal for the lower fluid chamber 144 defined between flange 116 and carrier 102. Radial washer 110 thus permits shoulder 62 of shell 12 to be eliminated, with a corresponding reduction in the radial dimension of skirt 118. Accordingly, the flexible lands of ring 108 and washer 110 both contribute to a reduction in the weight or mass of outer shell 104, an important objective in the design of a VCR piston.

I claim:

1. An internal combustion engine piston comprising a shell having a crown at one end and being open at the other end, a carrier disposed within said shell, said shell being movable axially relative to said carrier in response to reciprocation of the piston with respect to a combustion chamber of an engine, a retainer ring adapted to restrain said relative movement of said shell and carrier at the limit of relative movement of said shell toward the combustion chamber and being disposed in peripheral engagement with the interior of said shell, said shell having a series of circular internal lands formed therein axially between said retainer ring and the open end of the shell, a parted resilient snap ring having a series of circular external lands mating in interlocking engagement with said shell lands, said snap ring having an outside diameter in its free state such that said snap ring is radially compressed when in engagement with said shell lands to thereby develop radially outwardly self-biasing forces for maintaining the same in engagement with said shell lands, said snap ring being positioned in abutting relation with said retainer ring and means disposed axially between said retainer ring and said carrier for restraining axial movement of said retainer ring relative to said shell toward said carrier and for holding said retainer ring in said abutting relation with said snap ring.

2. The combination set forth in claim 1 wherein said carrier has a reduced diameter extension extending axially therefrom toward the open end of said shell and said retainer ring is generally L-shaped in radial cross section as defined by an axial wall and a radial flange thereof, said axial wall of said retainer ring receiving said carrier extension with a sliding fit, said radial flange of said retainer ring being interposed between said last-mentioned means and said snap ring.

3. The combination set forth in claim 1 wherein said lands of said snap ring and shell are asymmetrical in radial cross section and have mutually engaging surfaces inclined from the axis of said shell to force said snap ring axially toward said retainer ring upon radial expansion of said snap ring into engagement with said shell lands.

4. The combination set forth in claim 3 wherein said snap ring is dimensioned diametrically such that when it axially abuts said retainer ring said lands of said snap ring and shell are partially interengaged and a radial clearance remains between said lands to permit further radial expansion of said snap ring as wear occurs on said mutually engaging surfaces of said lands.

5. The combination set forth in claim 1 wherein said snap ring has a pair of ends spaced circumferentially from each other and defining a parting gap therebetween in the free state of said snap ring, said snap ring lands extending circumferentially around the outer periphery of said snap ring and spaced from one another axially of said ring, said ring lands each having first and second circumferential surfaces converging toward one another radially outwardly of said snap ring, said first surfaces of each ring land having a smaller angle of inclination relative to the axis of said snap ring than said second surface of said ring land, said shell lands likewise having first and second circumferential surfaces converging toward one another radially inwardly of said shell, each first surface of said shell lands having a smaller angle of inclination relative to the axis of said shell than each second surface of said shell lands, said second surfaces of said ring lands individually engaging said second surfaces of the associated shell lands, said first surfaces of each associated shell land and ring land being spaced from one another.

6. The combination set forth in claim 5 wherein said snap ring has an end surface in retaining axial abutment with said retainer ring and wherein said first surface of each ring land is disposed closer to said snap ring end surface than said second surface of each ring land.

7. The combination set forth in claim 6 wherein said angles of inclination of said first and second surfaces are approximately 30° and 95° respectively.

8. The combination set forth in claim 6 wherein said angles of inclination of said first and second surfaces are approximately 60° and 90° respectively.

9. The combination set forth in claim 6 wherein said first and second ring and shell land surfaces are conical in shape.

10. In combination, a member having a circular peripheral surface, stop means disposed adjacent said peripheral surface having a circumferentially extending abutment surface transverse to said peripheral surface, a retainer ring disposed coaxially with said peripheral surface of said member and in axially abutting relation with said abutment surface and a parted resilient snap ring disposed coaxially in peripheral engagement with said surface of said member and in axially abutting relation with said retainer ring, said retainer ring being axially interposed between said snap ring and said stop means, said member and said snap ring each having a plurality of mutually engaging complementary circular lands preventing relative axial movement between said member and said snap ring, said snap ring being dimensioned diametrically in its free state relative to said member such that said snap ring is radially stressed when said lands thereof are engaged with said lands of said member to thereby develop radial self-biasing forces for maintaining the same in engagement with said member, said mutually engaging lands developing a component of force biasing said snap ring axially toward said retainer ring when said snap ring is radially stressed by interengagement with said member, each snap ring land and associated land of said member having mutually contacting and parallel first surfaces inclined from the axis of said snap ring to develop said axial biasing force on said snap ring, each of said snap ring and associated member lands further having parallel second surfaces spaced radially from one another to permit further radial interengagement of said lands of snap ring and member as wear occurs on said first surfaces.

References Cited

UNITED STATES PATENTS

| | | | |
|---|---|---|---|
| 1,908,474 | 5/1933 | Dewees | 85—8.8 X |
| 2,322,138 | 6/1943 | Jenny | 85—8.8 |
| 2,524,273 | 10/1950 | Saler | 85—8.8 X |
| 2,595,787 | 5/1952 | Heimann | 287—53 |
| 2,697,871 | 12/1954 | Herman et al. | 29—229 |
| 2,742,027 | 4/1956 | Mansfield | 123—78 |
| 2,801,622 | 8/1957 | Andrews | 123—78 |
| 2,827,925 | 3/1958 | Meibaum | 85—8.8 X |
| 3,161,112 | 12/1964 | Wallace et al. | 123—48 X |
| 3,187,643 | 6/1965 | Pope | 92—216 X |

FOREIGN PATENTS 894,783    3/1944    France.

MARTIN P. SCHWADRON, *Primary Examiner.*

G. N. BAUM, *Assistant Examiner.*